(12) United States Patent
Burton et al.

(10) Patent No.: US 11,475,430 B2
(45) Date of Patent: Oct. 18, 2022

(54) DISTRIBUTED COMPUTING ENTITY FOR DETECTING DISCREPANCIES BETWEEN CALCULATIONS PERFORMED BY VARIOUS PROCESSING INSTANCES

(71) Applicant: CFA Properties, Inc., Atlanta, GA (US)

(72) Inventors: Matthew Ryan Burton, Atlanta, GA (US); Kristy Michelle Calhoun, Atlanta, GA (US); Joshua Paul Vanderwalker, Atlanta, GA (US); Bruno Malisheski, Atlanta, GA (US)

(73) Assignee: CFA Properties, Inc., Atlanta, GA (US)

( * ) Notice: Subject to any disclaimer, the term of this patent is extended or adjusted under 35 U.S.C. 154(b) by 0 days.

(21) Appl. No.: 16/155,063

(22) Filed: Oct. 9, 2018

(65) Prior Publication Data

US 2019/0114609 A1    Apr. 18, 2019

Related U.S. Application Data

(60) Provisional application No. 62/572,064, filed on Oct. 13, 2017.

(51) Int. Cl.
| | |
|---|---|
| *G06Q 20/20* | (2012.01) |
| *G06Q 20/40* | (2012.01) |
| *G06Q 20/32* | (2012.01) |

(52) U.S. Cl.
CPC ......... *G06Q 20/207* (2013.01); *G06Q 20/202* (2013.01); *G06Q 20/3224* (2013.01); *G06Q 20/4016* (2013.01)

(58) Field of Classification Search
CPC .................................................. G06F 11/1425
See application file for complete search history.

(56) References Cited

U.S. PATENT DOCUMENTS

| | | | |
|---|---|---|---|
| 7,398,247 B2 * | 7/2008 | Ryan, Jr. ................. | G06Q 20/10 705/31 |
| 7,493,397 B1 | 2/2009 | Guthrie et al. | |

(Continued)

OTHER PUBLICATIONS

Veltman, Noah (2013). Web APIs for non-programmers (hereinafter URL).*

(Continued)

*Primary Examiner* — Peter Ludwig
(74) *Attorney, Agent, or Firm* — Alston & Bird LLP

(57) ABSTRACT

A distributed transaction management computing system is configured for detecting transaction-specific data discrepancies that result from data calculations performed by different processing instances executing on geographically-distributed computing entities. The transaction-specific data discrepancies are identified via a network-accessible operations computing entity in electronic communication with a plurality of geographically-distributed edge computing entities. The operations computing entity defines at least two separate processing instances, wherein a first processing instance is configured to generate secondary data for individual transactions in the event that the edge computing entities do not themselves generate the transaction-specific secondary data; and wherein a second processing instance is configured to generate audit data for individual transactions. The operations computing entity compares the audit data and the secondary data for individual transactions to identify discrepancies therebetween that may arise from differences in data generation methodologies performed by the edge computing entities and the multiple operations computing entity processing instances.

6 Claims, 5 Drawing Sheets

(56) References Cited

U.S. PATENT DOCUMENTS

| | | | |
|---|---|---|---|
| 7,693,760 | B1 | 4/2010 | Fiteni et al. |
| 7,860,753 | B2 * | 12/2010 | Walker ................ G06Q 10/087 705/26.1 |
| 8,214,269 | B2 | 7/2012 | Wilmes et al. |
| 8,386,344 | B2 | 2/2013 | Christian et al. |
| 8,676,675 | B2 | 3/2014 | Von Drehnen et al. |
| 8,788,351 | B2 | 7/2014 | Francisco et al. |
| 2002/0052792 | A1 * | 5/2002 | Johnson ............... G06Q 40/123 705/19 |
| 2003/0040972 | A1 * | 2/2003 | Ryan, Jr. ................ G06Q 40/02 705/26.1 |
| 2003/0216981 | A1 | 11/2003 | Tillman |
| 2004/0030619 | A1 | 2/2004 | Stokes et al. |
| 2004/0181470 | A1 | 9/2004 | Grounds |
| 2008/0255971 | A1 * | 10/2008 | McKinnon ............ G06Q 40/02 705/31 |
| 2012/0323749 | A1 * | 12/2012 | Lapidus ................ G06Q 30/06 705/31 |
| 2014/0351105 | A1 * | 11/2014 | Hamm ................ G06Q 40/123 705/31 |
| 2015/0287005 | A1 * | 10/2015 | Hanson ................ G06Q 30/06 705/40 |
| 2017/0004478 | A1 * | 1/2017 | Velez ..................... G06Q 30/04 |
| 2018/0268015 | A1 * | 9/2018 | Sugaberry ............. G06N 5/003 |
| 2019/0114609 | A1 * | 4/2019 | Burton ............... G06Q 20/3224 |

OTHER PUBLICATIONS

"Vertex® Indirect Tax for Retail Product Guide" Vertex Inc., 37 pages, (2011). [Author unknown].

"Onesource: Indirect Tax for the Retail Enterprise," Thomson Reuters, 6 pages, (2013). [Author unknown].

"Autopart Basics," MAM Software Ltd, 160 pages, (2015). [Author unknown].

"Auto Parts Store Software—Automotive Aftermarket Solutions—Autopart," MAM Software Group, Inc., 10 pages, (2019). [Retrieved from the Internet Nov. 6, 2019: <URL: https://www.mamsoftware.com/usa/autopart>]. [Author unknown].

"Autopart Online—MAM Software," MAM Software Group, Inc., 10 pages, (2019). [Retrieved from the Internet Nov. 6, 2019: <URL: https://www.mamsoftware.com/usa/autopart-onlIne >]. [Author unknown].

"MAM Software to Preview Latest Software Release at AAPEX," Babcox Media, Inc., 6 pages, (2019). [Retrieved from the Internet Nov. 6, 2019: <URL: https://www.afterrnarketnews.com/rnam-software-preview-latest-software-release-aapex/>]. [Author unknown].

"Sales Tax, VAT, indirect tax software solutions," Thomson Reuters, 6 pages, (2019). [Retrieved from the Internet Nov. 6, 2019: <URL: https://tax.thomsonreuters.com/en/corporation-solutions/indirect-tax>]. [Author unknown].

Fletcher et al., "Demandware's Tomax Buy Moves to Win Stores With POS," Gartner Research, 2 pages, (2015). [Retrieved from the Internet Nov. 6, 2019: <URL: https://www.gartner.com/en/documents/2964524>]. [Abstract only].

"ALLDATA and MAM Software Launch ALLDATA Manage Online to Lift Auto Shop Profitability," ALLDATA LLC, 2 pages, (2013). [Retrieved from the Internet Nov. 6, 2019: <URL: https://www.alldata.com/press-release/alldata-onlIne-lift-auto-shop-profitability>]. [Author unknown].

\* cited by examiner

DISTRIBUTED COMPUTING ENTITY FOR DETECTING DISCREPANCIES BETWEEN CALCULATIONS PERFORMED BY VARIOUS PROCESSING INSTANCES

CROSS-REFERENCE TO RELATED APPLICATIONS

This patent application claims priority from Provisional Application Ser. No. 62/572,064 filed Oct. 13, 2017 and entitled "Cloud-Based Sales Tax Calculations for In-Person Sales Activity," which is incorporated herein by reference in its entirety.

BACKGROUND

Organizations operating a large number of distributed computing entities, such as organizations operating a number of brick-and-mortar retail establishments each having at least one Point-of-Sale (POS) computing entities, may be subject to data organization difficulties that may arise if different computing entities are completing data calculations via distinct data calculation rules. For example, sales tax calculations for in-person transactions may be calculated via a number of different tax calculation rules when performed by different computing entities. As those sales tax calculations are becoming increasingly more complex (particularly in the food and beverage industry) various distributed tax calculation systems are becoming more prone to making inconsistent tax calculations between multiple calculation instances. For example, certain cities now collect sales tax based on the amount and type of beverage sold (e.g., a $0.01/ounce sales tax on sodas). New sales taxes are constantly being introduced, with an increasing number of jurisdictions enacting their own variation on these hyper-localized taxes.

All businesses operating in these jurisdictions (whether through commonly owned business establishments or franchisee-owned business establishments) face challenges for implementing changes to their POS systems to begin collecting these taxes in a timely manner after the tax laws are enacted. These challenges are particularly acute for businesses having a plurality of locations spanning multiple jurisdictions (e.g., commonly owned business locations and/or collections of franchised business locations) each having corresponding sales tax laws and regulations. Due to the extremely localized nature of several current sales tax regimes, large businesses with multiple business locations must remain vigilant to monitor sales tax laws and regulations impacting each of their locations, and to deploy changes to POS systems quickly to ensure each store remains in compliance with applicable tax laws and regulations.

Moreover, the complexity of sales tax regimes applicable to certain businesses creates a need for higher levels of processing time/power to complete sales tax calculations for a given transaction. For example, a single transaction may require sales tax calculations based on the total sales of food items included in the transaction, the total sales price of non-food items included in the transaction, the total quantity and type of beverage sold during the transaction, the identification of various combinations of items that change the amount of tax due for a transaction, whether the purchaser is entitled to any sales tax exemptions, and if so, the extent of the exemptions, and/or the like.

Each time a sales tax regime applicable to a particular POS system changes, all impacted POS systems must be updated to ensure those systems continue to calculate sales taxes in accordance with applicable law. For businesses having locations in various tax jurisdictions, the process of maintaining up-to-date tax information for each POS system in each tax jurisdiction requires constant monitoring of tax law changes and frequent on-location update procedures to ensure every POS system is operating consistently with applicable law.

Accordingly, a need exists for sales tax calculation systems and methods that may be integrated with POS systems that are configured to quickly complete highly-accurate sales tax calculations for in-person transactions based on applicable, up-to-date sales tax laws and regulations.

BRIEF SUMMARY

A distributed computing system according to certain embodiments comprises a network accessible sales tax calculation engine operating via an operations computing entity in communication with geographically-distributed edge computing entities, such as POS terminals configured to complete in-person transactions at their respective locations. The distributed computing system is configured to automatically identify potential discrepancies between sales tax calculation results for individual transactions as performed by various computing entities such that potentially costly calculation errors may be quickly remedied. The sales tax calculation engine receives transaction data comprising data identifying items and/or services included in the transaction and a transaction location from the POS terminals in real-time, prior to the POS terminal completing a transaction with a customer. The sales tax calculation engine performs applicable sales tax calculations based on the location of the transaction, the included items of the transaction, and/or the transaction destination type (e.g., dine-in, carry-out, drive-through, and/or delivery), and transmits a sales tax data file identifying the amount of tax to be charged for the transaction back to the POS terminal. The POS terminal then adds the applicable tax amount to the transaction amount, collects the total transaction amount from the customer, and completes the transaction. The sales tax calculation system may later audit the transaction (e.g., a single-transaction audit, or as part of a multi-transaction audit), including the amount of tax calculated and collected for the transaction, based on a completed transaction data file transmitted from the POS terminal to the sales tax calculation engine. The completed transaction data file may comprise data identifying the items sold during a completed transaction, the location of the completed transaction, and the amount of tax collected for the completed transaction. The sales tax calculation engine may recalculate the amount of sales tax due for the transaction, and may calculate a difference between the initial sales tax calculation amount (the amount of sales tax actually paid by the customer) and the audited sales tax calculation amount to determine whether taxes calculated properly for various transactions and/or to determine whether adjustments are needed to the sales tax calculation engine. The completed data file may then be stored (together with the audited amount of sales tax due) in a tax database that may be used to determine an appropriate amount of sales tax to be remitted to appropriate taxing authorities.

Various embodiments are directed to a distributed transaction management computing system for detection of transaction-specific data discrepancies among processing instances executing on geographically-distributed computing entities. In certain embodiments, the distributed transaction management computing system comprises: a plurality of geographically-distributed edge computing entities each configured to initiate transactions by generating transaction-specific data; and a network-accessible operations computing entity in electronic communication with the plurality of geographically-distributed edge computing entities, the network-accessible operations computing entity defining at least two separate processing instances, the separate processing instances being accessible via at least two network communications channels each corresponding to a single processing instance and accessible to the plurality of geographically-distributed edge computing entities; and wherein at least one of an edge computing entity or a first processing instance of the operations computing entity is configured to generate secondary transaction-specific data for each of the transactions initiated via one or more edge computing entities; and wherein a second processing instance of the operations computing entity is configured to generate audit data for each of the transactions; and wherein the second processing instance of the operations computing entity is configured to identify discrepancies between the secondary transaction-specific data and the audit data for at least one of the transactions and to generate a record in response to the detection of a data discrepancy.

In certain embodiments, the first processing instance and the second processing instance of the operations computing entity are configured to execute identical programming instructions. Moreover, each of the one or more geographically-distributed edge computing entities may comprise Point-of-Sale (POS) computing entities; each of the transactions may be embodied as sales transactions initiated at a POS computing entity; and the secondary transaction-specific data and the audit data may each identify tax amounts due for corresponding transactions. In certain embodiments, each of the plurality of geographically-distributed edge computing entities are configured to: generate a transaction data file corresponding to a transaction; transmit the transaction data file to the first processing instance via a corresponding communication channel; and upon the occurrence of a trigger event (e.g., an elapsed period of time), generate secondary transaction-specific data for the transaction.

More, each of the plurality of geographically-distributed edge computing entities may be further configured to: compile the secondary transaction-specific data with the transaction-specific data into a completed transaction data file; and transmit the completed transaction data file to the second processing instance via a corresponding communication channel. The operations computing entity may be further configured to receive, via a network communications channel corresponding to the first processing instance, transaction-specific data corresponding to a transaction from a first edge computing entity; generate, via the first processing instance, secondary transaction-specific data for the transaction; transmit the secondary transaction-specific data to the first edge computing entity; receive, via a network communications channel corresponding to the second processing instance, completed transaction data corresponding to the transaction; and generate, via the second processing instance, audit data for the transaction. Each of the separate processing instances may be accessible via separate Uniform Resource Locator addresses.

Certain embodiments are directed to a method for detecting transaction-specific data discrepancies among processing instances executing on geographically-distributed computing entities. In certain embodiments, the method comprises: initiating a transaction via an edge computing entity by generating transaction-specific data and/or receiving transaction-specific data via first network communications channel associated with a first processing instance operating on an operations computing entity generated by an edge computing entity that is geographically-spaced from the operations computing entity; generating, via at least one of the edge computing entity or the first processing instance of the operations computing entity, secondary transaction-specific data for the transaction; compiling the transaction-specific data and the secondary transaction-specific data into completed transaction data (e.g., via the edge computing entity); transmitting at least a portion of the completed transaction data to a second processing instance operating on the operations computing entity via a second network communications channel; generating, via the second processing instance of the operations computing entity, audit data for the transaction; identifying one or more discrepancies between the secondary transaction-specific data and the audit data; and generating a record upon the detection of a discrepancy between the secondary transaction-specific data and the audit data.

Moreover, generating secondary transaction-specific data for the transaction via the first processing instance of the operations computing entity may comprise executing a first copy of programming instructions; and generating audit data for the transaction via the second processing instance of the operations computing entity may comprise executing a second copy of programming instructions, wherein the first copy and the second copy include identical programming instruction portions. Moreover, initiating a transaction via an edge computing entity may comprise initiating a sales transaction; and generating secondary transaction-specific data and generating audit data may each comprise generating tax data identifying tax amounts due for corresponding sales transactions. In certain embodiments, transmitting at least a portion of the transaction-specific data comprises: generating a transaction data file corresponding to a transaction; and transmitting the transaction data file to the first processing instance via a corresponding communication channel; and generating secondary transaction-specific data for the transaction via the edge computing entity may comprise: detecting the occurrence of a trigger event (e.g., an elapsed period of time); and generating the secondary transaction-specific data for the transaction via the edge computing entity. Moreover, transmitting at least a portion of the transaction-specific data to a first processing instance may comprise transmitting the at least a portion of the transaction-specific data to a first URL; and transmitting at least a portion of the completed transaction data to a second processing instance may comprise transmitting the at least a portion of the transaction-specific data to a second URL.

Certain embodiments are directed to a network-accessible operations computing entity configured for detecting transaction-specific data discrepancies generated via processing instances executing on geographically-distributed computing entities. The operations computing entity may comprise: one or more non-transitory memory storage areas; and one or more processors collectively defining at least two separate processing instances, each of the separate processing instances are accessible via a corresponding network communications channel accessible to a plurality of geographically-distributed edge computing entities, wherein the one or more processors may be collectively configured to: receive, via a first communications channel corresponding to a first processing instance, transaction-specific data corresponding to a transaction initiated via one of the plurality of geographically-distributed edge computing entities; generate, via the first processing instance, secondary transaction-specific data corresponding to the transaction; transmit the secondary transaction-specific data to the one of the plurality of geographically-distributed edge computing entities; receive, via a second communications channel corresponding to a second processing instance, completed transaction data corresponding to a transaction completed via the one of the plurality of geographically-distributed edge computing entities, wherein the completed transaction data comprises transaction-specific data and secondary transaction-specific data generated by one of the first processing instance or the one of the plurality of geographically-distributed edge computing entities; generate, via the second processing instance, audit data corresponding to the transaction; identify one or more discrepancies between the secondary transaction-specific data of the completed transaction data and the audit data; and generate a record upon the detection of a discrepancy between the secondary transaction-specific data and the audit data.

Moreover, generating secondary transaction-specific data for the transaction via the first processing instance may comprise executing a first copy of programming instructions; and generating audit data for the transaction via the second processing instance may comprise executing a second copy of programming instructions, wherein the first copy and the second copy include identical programming instruction portions. In certain embodiments, the transaction-specific data corresponds to a sales transaction initiated as a Point-of-Sale (POS) terminal associated with an edge computing entity, and generating secondary transaction-specific data and generating audit data each comprise generating tax data identifying tax amounts due for corresponding sales transactions.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1:
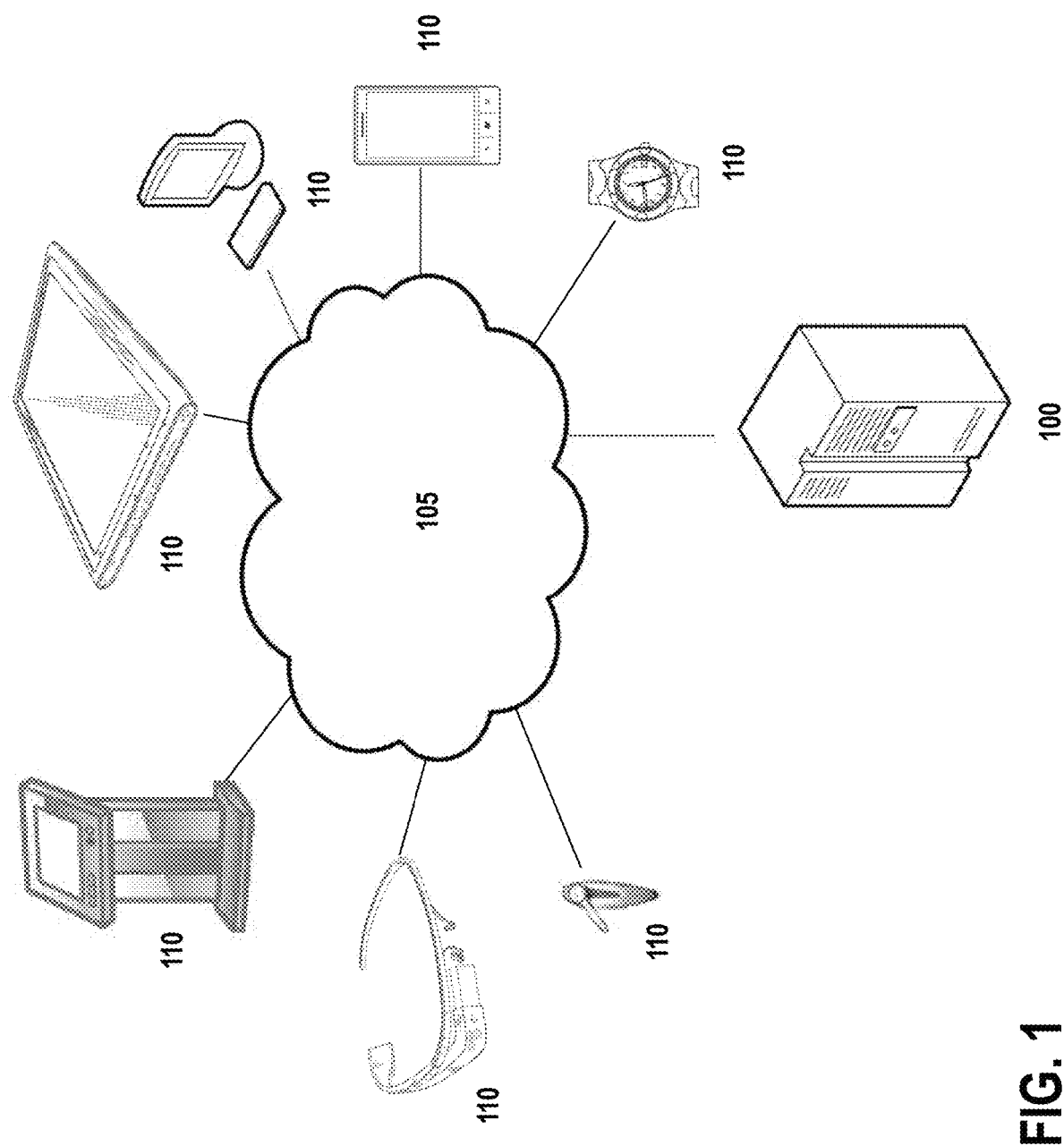
FIG. 1 is an overview of a system that can be used to practice various embodiments.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

I. Overview

In various embodiments, an operations computing entity may be embodied as an Internet-accessible computing entity (e.g., a cloud-based computing system) configured to execute a sales tax calculations engine to perform various calculations as needed by Internet-connected edge computing entities, such as POS terminals and/or POS servers located geographically remotely from the operations computing entity. As just one non-limiting example, the operations computing entity may comprise an executable sales tax calculation engine operating on a first processing instance and configured to perform sales tax calculations and to generate secondary transaction-specific data (e.g., data identifying an amount of tax owed for a transaction) in real-time for transactions occurring at one or more distributed POS terminals, after the POS terminals transmit transaction data to the operations computing entity via a first communications pathway (e.g., identified by a first URL). The sales tax calculation engine may comprise various calculation rules for selecting appropriate sales tax rates based on the location of the transaction, the types of items purchased during the transaction, and/or other transaction-specific information included in a calculation request (e.g., a transaction data file) received from the POS terminal (e.g., via a POS server in communication with the POS terminal). For example, the sales tax calculation engine may be configured to select and apply appropriate state sales tax rates to a transaction, appropriate municipal sales tax rates, item-specific sales tax rates (e.g., a $0.01 tax per ounce of sugary beverage sold), and/or the like.

Once the sales tax calculation engine has determined the appropriate sales tax to be collected for a particular transaction, the operations computing entity may generate a secondary transaction-specific data file (e.g., a tax data file) including the sales tax amount for the particular transaction, and may transmit the generated tax data file to the POS terminal (e.g., via the POS server). The POS terminal identifies the amount of tax due for the transaction from the tax data file and adds the tax amount to a transaction subtotal to be charged to the customer for the transaction. The sales tax calculation engine may then clear the calculation request (including the transaction-specific information) from memory.

After the transaction is complete, the POS terminal may send completed transaction data indicative of characteristics of the completed transaction to the operations computing entity to execute audit procedures on the completed transaction. In certain embodiments, the completed transaction data may be transmitted to the operations computing entity via a separate communications pathway identified by a separate URL from the initial real-time tax calculations. The operations computing entity may execute a second copy/instance of the sales tax calculation engine via a second processing instance based on the data received for the completed transaction to recalculate the amount of sales tax that should have been collected for the transaction. The operations computing entity may then determine a difference between the amount of sales tax collected and the audited amount of sales tax due to determine whether there is a discrepancy between the generated secondary transaction-specific data (e.g., tax data generated in real-time for the transaction) and the generated audit data (e.g., tax data generated after the completion of the transaction) that may be indicative of a deficiency in the amount of sales tax collected. The operations computing entity may then make adjustments to the sales tax calculation engine to eliminate the determined tax deficiency for future transactions and/or the operations computing entity may generate an alert/notification/record to appropriate personnel (e.g., the operations computing entity may notify tax or computing personnel via a message (e.g., an email) generated and transmitted to an edge computing entity associated with the appropriate personnel) to remedy the identified tax calculation error. Such notifications and/or adjustments may be performed periodically (e.g., at defined time intervals), in real-time, and/or the like. Moreover, the operations computing entity may store the completed transaction record together with data indicative of the results of the sales tax audit in a transaction database accessible to one or more edge computing entities (e.g., user computing entities) for later retrieval.

As new tax laws/rules are enacted, the calculation rules for the sales tax calculation engine may be updated to reflect the updated tax laws/rules, and may be thereafter applied to for secondary transaction-specific data generation relating to any transaction for which the updated tax laws/rules apply. Maintaining an up-to-date sales tax calculation engine configured for calculating sales taxes for transactions occurring at geographically remote POS terminals enables the collective sales tax calculation system (including both the operations computing entity and the plurality of POS terminals) operate more efficiently than an edge computing system configured to calculate sales taxes at individual POS terminals for locally initiated transactions. Individual POS terminals in such a configuration may have lower processing capacity requirements to initiate, complete, and/or reconcile transactions, and the sales tax calculation system may instead rely on scalable processing capacity offered by an operations computing entity in network communication with each POS terminal to quickly calculate appropriate sales tax amounts for individual transactions initiated at geographically remote POS terminals. Moreover, such a configuration provides for a backup sales tax calculation mechanisms not possible via edge-calculation methodologies. The sales tax may be primarily calculated via the operational computing entity, but the sales tax calculation system additionally includes a backup tax calculation mechanism locally executable on each of a plurality of POS terminals. Thus, in the event the primary tax calculation mechanism (operable via the operations computing system) is unavailable, various configurations provide a backup tax calculation mechanism (operable via each POS terminal individually).

II. Computer Program Products, Methods, and Computing Entities

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like). A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. Exemplary System Architecture

FIG. 1 provides an illustration of an exemplary embodiment of the present invention. As shown in FIG. 1, this particular embodiment may include one or more operations computing entities 100, one or more networks 105, and one or more edge computing entities 110. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

1. Exemplary Operations Computing Entity

Figure 2:
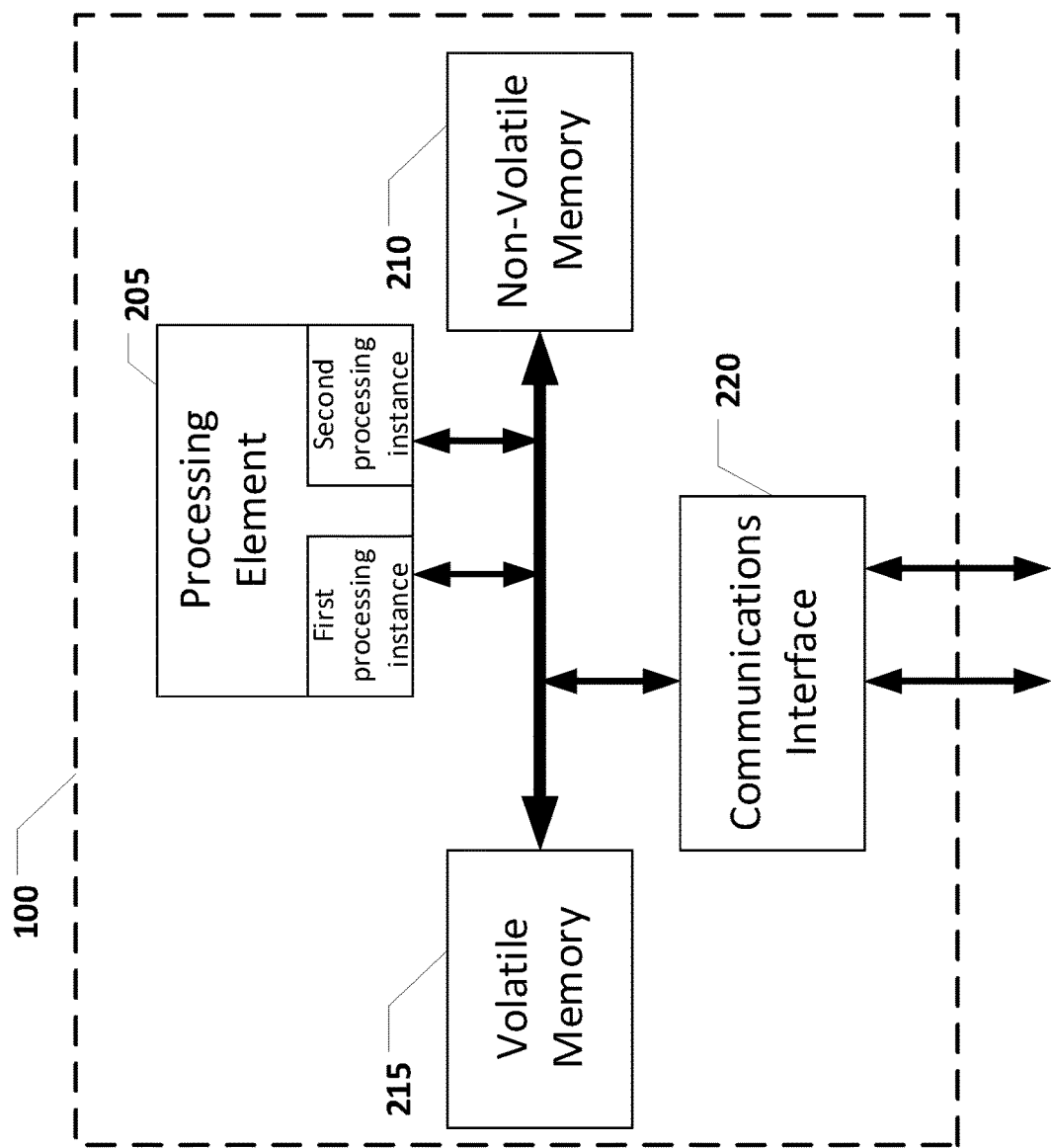
FIG. 2 is an example schematic diagram of an operations computing entity according to one embodiment.

FIG. 2 provides a schematic of an operations computing entity 100 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, ear pieces, scanners, televisions, wristbands, wearable items, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the operations computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. In certain embodiments, the one or more communications interfaces 220 may be configured to maintain a plurality of separate communication channels, each configured to support a corresponding communications pathway for data flowing to the operations computing entity 100. Each of the communications channels may have associated communications directory location (e.g., a Uniform Resource Locator (URL)) that may be usable to direct data to the operations computing entity 100.

As shown in FIG. 2, in one embodiment, the operations computing entity 100 may include or be in communication with one or more processing elements 205 (also referred to as processors, processing circuitry, and/or similar terms used herein interchangeably) that communicate with other elements within the operations computing entity 100 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In certain embodiments, the processing element 205 may comprise a portion of a processing array comprising a plurality of processing elements 205. The plurality of processing elements 205 of the processing array may each be configured to perform isolated processing functions simultaneously, without regard for the current processes performed by other processing elements 205 within the processing array. Moreover, at least a subset of the plurality of processing elements 205 may be configured to be selectably linked together to provide an expanded processing capability for a particular processing task. Thus, the processing element of the operations computing entity 100 may have a variable processing capacity that may be selectably expanded or contracted to perform more complex processing tasks or to conserve electrical power when performing relatively simple processing tasks, as needed.

Moreover, each of the plurality of processing elements 205 may be associated with respective communications channels (and associated URLs), such that data directed to a particular URL is passed to a particular processing element 205.

In one embodiment, the operations computing entity 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the operations computing entity 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the operations computing entity 100 with the assistance of the processing element 205 and operating system.

As indicated, in one embodiment, the operations computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the operations computing entity 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol.

Although not shown, the operations computing entity 100 may include or be in communication with one or more input elements, such as a keyboard input, a mouse input, a touch screen/display input, motion input, movement input, audio input, pointing device input, joystick input, keypad input, and/or the like. The operations computing entity 100 may also include or be in communication with one or more output elements (not shown), such as audio output, video output, screen/display output, motion output, movement output, and/or the like.

As will be appreciated, one or more of the operations computing entity's 100 components may be located remotely from other operations computing entity 100 components, such as in a distributed system. Furthermore, one or more of the components may be combined and additional components performing functions described herein may be included in the operations computing entity 100. Thus, the operations computing entity 100 can be adapted to accommodate a variety of needs and circumstances. As will be recognized, these architectures and descriptions are provided for exemplary purposes only and are not limiting to the various embodiments.

2. Exemplary Edge Computing Entity

Figure 3:
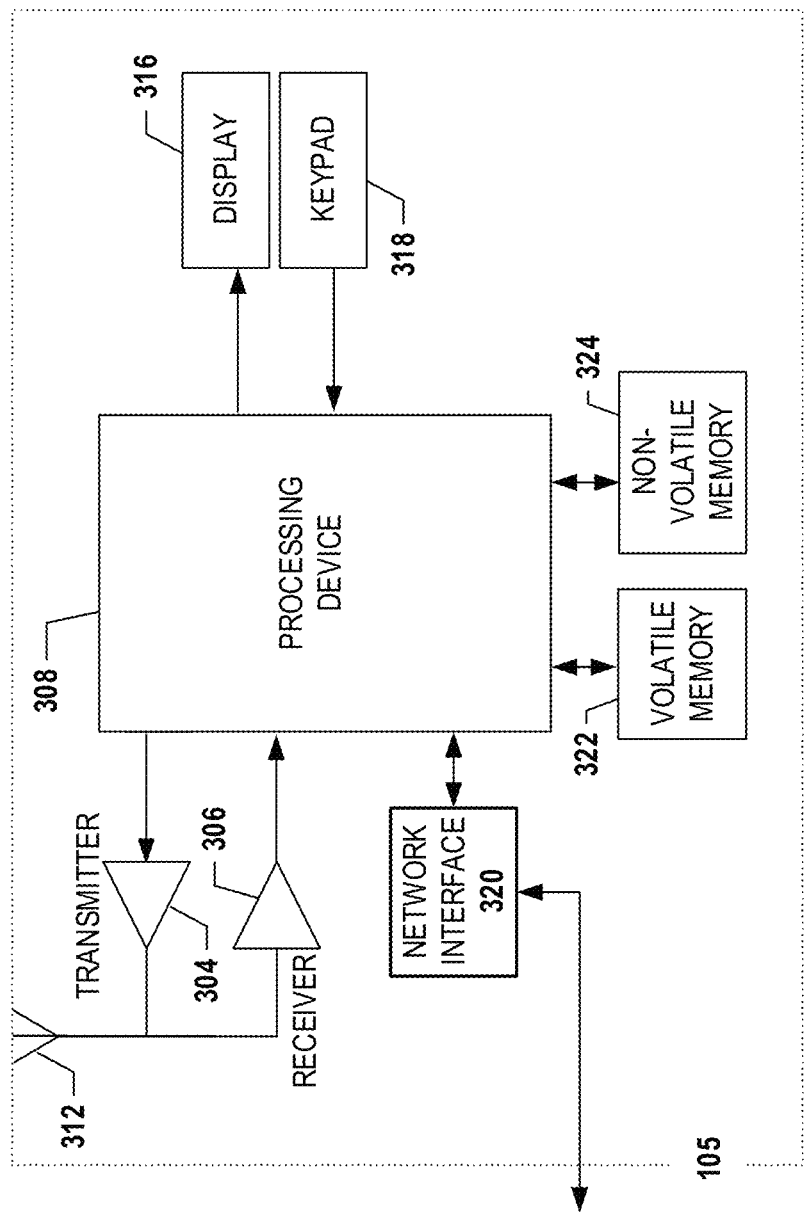
FIG. 3 is an example schematic diagram of an edge computing entity according to one embodiment.

A user (e.g., an individual, a family, a company, an organization, an entity, a department within an organization, a representative of an organization and/or person, and/or the like) may operate an edge computing entity 110 that includes one or more components that are functionally similar to those of the operations computing entity 100. FIG. 3 provides an illustrative schematic representative of an edge computing entity 110 that can be used in conjunction with embodiments of the present invention. Edge computing entities 110 can be operated by various parties. For example, edge computing entities 110 embodied as POS terminals (e.g., at a physical retail location, restaurant location, and/or the like) may be operated by customer service representatives at the physical locations, by customers (e.g., operating a self-checkout style POS terminal), and/or the like. As yet another example, edge computing entities 110 embodied as user computing entities (e.g., desktop computers, laptop computers, mobile computers, tablet computers, smartphones, and/or the like) may be operated by various users, such as retail or restaurant employees having a managerial role, customers accessing data made available to those customers via a network (e.g., the Internet), and/or the like.

As shown in FIG. 3, the edge computing entity 110 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information in accordance with air interface standards of applicable wireless systems. In this regard, the edge computing entity 110 may be capable of operating with one or more air interface standards, communication protocols, modulation types, and access types. More particularly, the edge computing entity 110 may operate in accordance with any of a number of wireless communication standards and protocols, such as those described above with regard to the operations computing entity 100. In a particular embodiment, the edge computing entity 110 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the edge computing entity 110 may operate in accordance with multiple wired communication standards and protocols, such as those described above with regard to the operations computing entity 100 via a network interface 320.

Via these communication standards and protocols, the edge computing entity 110 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The edge computing entity 110 can also download changes, add-ons, and updates, for instance, to its firmware, software (e.g., including executable instructions, applications, program modules), and operating system.

According to one embodiment, the edge computing entity 110 may include location determining aspects, devices, modules, functionalities, and/or similar words used herein interchangeably. For example, the edge computing entity 110 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information can be determined by triangulating the edge computing entity's 110 position in connection with a variety of other systems, including cellular towers, Wi-Fi access points, and/or the like. Similarly, the edge computing entity 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The edge computing entity 110 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the edge computing entity 110 to interact with and/or cause display of information from the operations computing entity 100, as described herein. The user input interface can comprise any of a number of devices or interfaces allowing the edge computing entity 110 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the edge computing entity 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The edge computing entity 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the edge computing entity 110. As indicated, this may include a user application that is resident on the entity or accessible through a browser or other user interface for communicating with the operations computing entity 100 and/or various other computing entities.

In another embodiment, the edge computing entity 110 may include one or more components or functionality that are the same or similar to those of the operations computing entity 100, as described in greater detail above. As will be recognized, these architectures and descriptions are provided for exemplary purposes only and are not limiting to the various embodiments.

IV. Example System Operation

Example processes according to one embodiment are now described with reference to the flowchart of FIG. 4. As discussed herein, various steps may be performed by various computing entities, such as one or more edge computing entities 110 (e.g., POS terminals), the operations computing entity 100, and/or the like.

1. Tax Rule Item Correlation Data

As discussed herein, sales tax laws/rules are generally location specific, and may be dependent on a type of item sold during a given transaction. Accordingly, the sales tax calculation engine in various embodiments relies on a stored tax data matrix linking particular tax rules executable by the sales tax calculation engine with particular locations, items, and/or other transaction characteristics impacting the applicability of a particular tax rule to a particular transaction. Based at least in part on data provided for a particular transaction (e.g., location data, included items data, customer data, and/or the like), the sales tax calculation engine may query the stored tax data matrix to identify appropriate tax rates to apply to a particular transaction.

As just one example organizational structure for a tax data matrix, the tax data matrix may comprise a plurality of tax rate records provided in a hierarchical organizational structure in a tax rate database accessible to the sales tax calculation engine. The plurality of tax rate records may be provided by a third party entity (e.g., a tax management entity computing system), and/or the tax rate records may be locally generated and/or locally updated at the operations computing entity 100. For example, the plurality of tax rate records may be provided by the tax management entity computing system and/or updated periodically (e.g., monthly) to reflect changes in tax laws corresponding to the tax rate records. However, the tax rate records may be generated and/or updated locally (e.g., via user input) at the operations computing entity 100. At a top level of the hierarchical organizational structure, the tax data matrix may identify locations for which a particular tax rate is applicable. The locations may be organized in a hierarchical manner within the tax data matrix (e.g., such that a top level identifies a country/federal tax, a second level identifies a state sales tax, a third level identifies a county sales tax, and a fourth level identifies a municipal tax).

Under each location, tax rates applicable for transactions occurring in the particular location may be identified. These tax rates may be linked with particular items and/or item categories for which taxes may be calculated (e.g., items offered for sale by a particular retailer), particular transaction destination types (e.g., dine-in, drive-through, take-out, delivery, and/or the like), particular transaction locations (e.g., transaction initiation locations, such as the location of the POS terminal, or transaction completion locations, such as a delivery address for the transaction). In certain embodiments, the items may be identified within the tax data matrix by unique item identifiers, item categories, and/or the like. Thus, tax rates identified within the tax data matrix may be correlated with specific items (e.g., specific menu items offered by a restaurant, such as a single spicy chicken sandwich, a spicy chicken sandwich combo meal including a 16 ounce soft drink and a medium French fry order, a 12 ounce milkshake, and/or the like), specific item categories encompassing a plurality of individual items (e.g., prepared foods, which may encompass chicken sandwiches, chicken nuggets, French fries, hash browns, and/or the like; or beverages, which may encompass soft drinks, milk, and juice, and/or the like). Although the above examples suggest that tax rates may be correlated with specific items identified by narrative item descriptions, tax rates may also be correlated with specific items identified by item identifiers, such as alpha-, numeric-, or alphanumeric item identifiers and/or item category identifiers (e.g., a first tax rate in a first jurisdiction is applicable to item 00001; a second tax rate in a second jurisdiction is applicable to item category 5xxx; and/or the like).

Moreover, each tax rate entry in the tax data matrix may comprise information/data indicative of one or more tax exemptions applicable to the particular tax rate. For example, various organizations (e.g., non-profit organizations) may be entitled to sales tax exemptions for certain purchases made on behalf of the organizations. These exemptions may only be applicable to certain sales taxes for example (e.g., an organization may be exempt from state-specified sales taxes, but not exempt from municipality specified sales taxes).

As discussed in greater detail below, transaction data generated by and transmitted from an edge computing entity 110 may comprise data identifying items/foods included in a particular transaction based on unique item identifiers and/or item categories. Accordingly, each edge computing entity 110 may comprise or have access to (e.g., via a network) data identifying unique item identifiers and/or item categories for items offered for sale via the edge computing entity 110. Thus, upon generating a transaction data file to be transmitted to the operations computing entity 100, an edge computing entity 110 may populate the generated data file with unique item identifiers and/or item categories that may be correlated with tax rate data in the tax data matrix to identify tax rates applicable to items included in the transaction.

Because all tax rate data is stored via a database accessible to the operations computing entity 100, updating the tax rate data to reflect changes to tax laws/rules for a particular jurisdiction may be completed by updating the tax data matrix. For example, a new tax law/rule may be added to the tax data matrix by providing rate data (e.g., the tax rate, such as a percentage of sales price, amount per unit of item sold, a flat fee or tax rate per transaction, and/or the like) and data identifying applicable items (e.g., by item category, unique item identifier, and/or the like). The newly added tax data may be stored in a new tax data record in the tax data matrix, and may be retrieved as necessary by the sales tax calculation engine for calculating sales tax for various transactions. Moreover, the operations computing entity 100 may be configured to generate and/or transmit notifications to various edge computing entities 110 (e.g., via email or other electronic notification mechanism) upon determining that tax rate changes impacting a particular location associated with the edge computing entity 110 have been implemented. For example, upon implementing a new tax that impacts all restaurant locations within the Atlanta, Ga. city limits, the operations computing entity 100 may generate and transmit a notification to those restaurant locations via email, to inform staff at those restaurant locations of the change in tax rate. The operations computing entity 100 may also generate and transmit notifications to various tax-related personnel (e.g., corporate tax personnel) indicative of the newly implemented tax rate changes.

Moreover, the tax rate data stored within the database may be updated via a zero downtime update methodology. In certain embodiments, a snapshot of data stored within the database may be downloaded onto a local computing entity controllable by a network administrator. Downloading the snapshot does not impact the operability of the one or more processing instances and/or tax data matrix instances stored in the database, and therefore the processing instances may continue to operate while the tax data is being updated. The new tax data may be added to the downloaded snapshot data, and the snapshot data may be uploaded to a non-operational tax data instance in the database. Once the updated tax law data is fully uploaded and accessible via the database, the database may be redirected to reference the non-operational tax data (thereby changing the operational tax data instance stored within the database) for all future tax calculation requests. The updated tax data instance may be copied among a plurality of non-transitory computer readable storage media, such that the updated tax data is accessible via a plurality of storage media. The previous, now outdated tax data instance may remain stored via the database as a non-operational tax data instance. For example, the outdated tax data may remain stored via the database for a defined period of time and/or until the occurrence of a trigger event before being removed.

In certain embodiments, adding a new item to be offered for sale by one or more edge computing entities 110 comprises steps for adding new item data to each edge computing entity 110 to offer the item for sale (e.g., via the operations computing entity 100, via a separate, central computing entity, and/or the like), adding a new unique item identifier to the edge computing entity 110 and the tax data matrix, correlating the new unique item identifier to an item category (at the tax data matrix and/or at the edge computing entity 110), and/or generating a new item category for the new item (as applicable). The new item data may be updated at the operations computing entity 100 and/or a separate central computing entity and transmitted to one or more edge computing entities 110. Alternatively, the new item data may be updated at each edge computing entity 110 individually and may be separately provided to the operations computing entity 100 (e.g., via manual data entry or by transmitting data from one or more edge computing entities 110 to the operations computing entity 100).

As discussed in greater detail herein, the operations computing entity 100 may transmit portions of the tax data matrix to various edge computing entities 110 (e.g., POS terminals, location-specific computing entities, and/or the like) to be used as a backup source of tax rate data for transactions occurring via those edge computing entities 110. The operations computing entity 100 may be configured to generate and/or transmit the tax data to the various edge computing entities 110 in response to an inquiry from each edge computing entity 110 (e.g., a "pull" data request), or the operations computing entity 100 may be configured to self-generate and transmit the tax data (e.g., a "push" data request). For example, the operations computing entity 100 may be configured to generate location-specific tax data matrices, and to transmit those location-specific matrices to edge computing entities 110 operating within the corresponding location. Thus, in the event that the edge computing entity 110 is unable to communicate with the operations computing entity 100, the edge computing entity 110 may still calculate tax amounts for transactions occurring while the communication link between the edge computing entity 110 and the operations computing entity 100 is unavailable. In certain embodiments, the locally stored tax data matrix at each edge computing entity 110 may be less comprehensive than the tax data matrix stored at the operations computing entity 100 (for example, due at least in part to the limited processing power available for sales tax calculations via the edge computing entity 110), and accordingly the edge computing entity 110 may be unable to complete complex tax calculations without reference to the operations computing entity 100.

2. Transaction Initiation

Figure 4A:
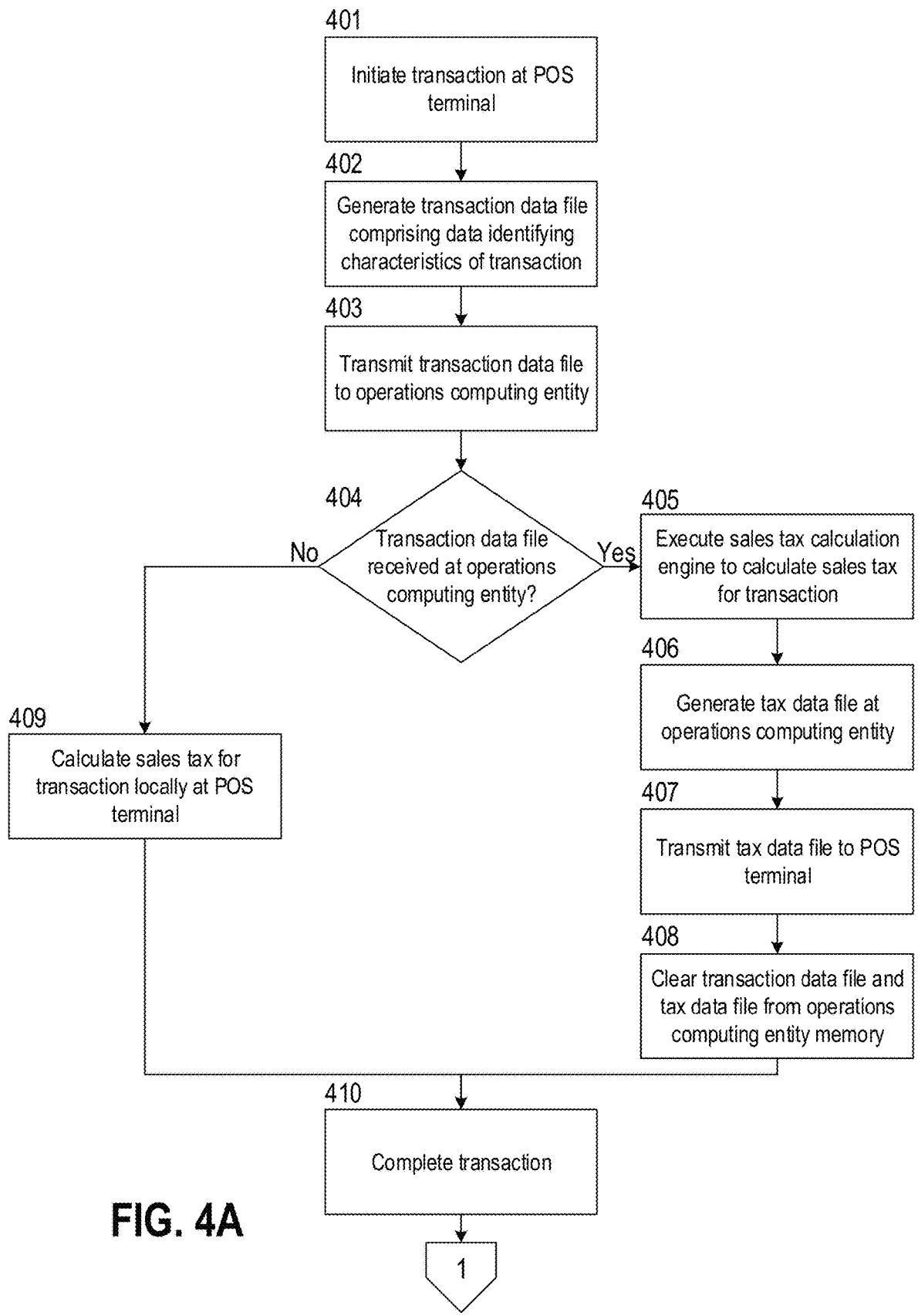
FIGS. 4A-B collectively show a flowchart showing an example process for calculating a sales tax amount for a transaction according to one embodiment.

A particular transaction may be initiated at an edge computing entity 110, such as a POS terminal as indicated at Block 401 of FIG. 4A. For example, a transaction may comprise an in-person transaction at a particular retail or dining establishment (e.g., a brick-and-mortar retail store, a restaurant, and/or the like) or an in-person transaction occurring at a mobile retail or dining establishment (e.g., a food truck, a mobile retail establishment, and/or the like). During initiation of the transaction, the POS terminal generates a transaction data record as indicated at Block 402 that may be populated with transaction specific data. The transaction data record may be a single record within a locally-stored (e.g., at the POS terminal) transaction database. As data for the transaction is generated (e.g., as a customer provides information about items to be purchased during the transaction, whether the customer is eligible for one or more tax exemptions (e.g., non-profit charitable organization sales tax exemptions, based at least in part on user input identifying particular sales tax exemptions applicable to a particular organization, and/or the like), where the transaction is to be consummated (e.g., at the sales location or delivered to another geographically distant location), and/or the like), the POS terminal may populate the transaction data record with data specific to the particular transaction, including the items and quantity of items to be purchased during the transaction, the transaction location, a transaction destination type (e.g., dine-in, drive-through, take-out, delivery, and/or the like), a cost of the transaction (e.g., a summed subtotal cost of items included in the transaction and/or itemized costs for each item in the transaction), and customer information identifying sales tax exemption status for the customer, and/or the like. In certain embodiments, exemption data identifying sales tax exemptions for particular customers may be generated prior to initiating a transaction, and the exemption data may be stored (e.g., stored locally at the POS terminal) and accessed during a later transaction for the particular customer.

Once complete data regarding the transaction is available and stored within the transaction data record, the POS terminal stores the transaction data record locally and/or generates a standalone transaction data file comprising transaction data from the transaction data record to be transmitted to the operations computing entity 100 as a part of, or embodied as a request to calculate sales tax for the transaction in real-time, as indicated at Block 403. The transaction data record may be transmitted via a first communications channel defined by a first URL providing data to a first processing instance associated with the operational computing entity 100 (e.g., operated on one or more physical computing processors that collectively function to perform computing tasks assigned to the first processing instance). For example, the transaction data record may be generated and/or stored in a local database of transaction data as a single database entry, and/or may be configured for use with a particular POS software system. The POS terminal thus generates a separate, transaction data file (e.g., an XML data file) that may be transmitted via a network to the operations computing entity 100 (via the first communications channel). The transaction data file may be compiled for use by the operations computing entity, and may be provided as a stand-alone data file containing data corresponding to a single transaction. Thus, in embodiments in which transaction data records are provided as individual database entries, the generation of the stand-alone, transmittable transaction data file enables transaction data for a single transaction to be quickly transmitted to the operations computing entity, for example, for real time calculation of taxes for the transaction. The POS terminal may be configured to store the completed transaction data record and/or generate and transmit a transmittable transaction data file in response to a trigger event (e.g., receipt of user input indicating the transaction data is complete).

Moreover, as discussed herein, the POS terminal (as one example of an edge computing entity 110) may comprise location determining aspects configured to determine a current location of the POS terminal. Thus, the POS terminal may be configured to self-determine its location via the location determining aspects, and provide the self-generated location data to the transaction data record (and/or the transaction data file) during collection of transaction data. As yet another example, the POS terminal may have locally stored data identifying the location of the POS terminal (e.g., POS terminal located at store 12345 in Atlanta, Ga.), and the POS terminal may be configured to update the transaction data record (and/or the transaction data file) with the locally stored location data for the POS terminal.

3. Sales Tax Calculation

The sales tax calculations may be completed at the operations computing entity 100 executing the sales tax calculation engine and secondary transaction-specific data identifying an amount of tax due for a particular transaction may be generated by the operations computing entity 100. The operations computing entity 100 may be configured to receive and/or process a plurality of sales tax calculation requests simultaneously and/or consecutively in real-time to calculate sales tax for various on-going transactions occurring at one or more edge computing entities 110 (e.g., POS terminals), as represented at Block 404 of FIG. 4A. Moreover, the operations computing entity 100 may be configured to run multiple instances (e.g., each accessible via separate communications channels via separate URLs and each configured to independently perform separate tasks) of a sales tax calculation engine, and may be configured to automatically scale (e.g., expand or reduce) the amount of processing resources (e.g., processing power provided by one or more processing elements 205 of a processing array) based on a detected number of requests received by the operations computing entity 100, a processing demand experienced by the operations computing entity 100, and/or the like. Thus, the operations computing entity 100 may be configured to self-adjust the amount of processing power available for utilization by the operations computing entity 100 to minimize the time required to complete a sales tax calculation for one or more on-going transactions in real time. For example, under a high processing demand period, the operations computing entity 100 may utilize an increased amount of processing capacity (e.g., by utilizing additional processing elements 205 within a processing array) relative to the processing capacity utilized during a low processing demand period (e.g., in which a decreased number of processing elements 205 within a processing array may be utilized). Moreover, the operations computing entity 100 may be configured to select between alternative processing elements 205 upon determining that a particular processing element 205 is damaged or malfunctioning to retain a desired processing capacity of the operations computing entity 100 for executing the sales tax calculation engine.

Moreover, the operations computing entity 100 may comprise multiple, separate processing instances each configured for performing sales-tax calculations (and generating related secondary transaction-specific data) under specific circumstances. For example, a first processing instance may be configured for generating secondary transaction-specific data for on-going transactions in real-time upon receipt of transaction-specific data via a first URL associated with the first processing instance. The operations computing entity 100 may additionally define a second processing instance configured for generating audit data for individual transactions after the completion of those transactions (e.g., upon receipt of completed transaction data via a second URL associated with the second processing instance). In certain embodiments, each of the first processing instance and the second processing instance may have individually-expandable processing resource capacity that enables each processing instance to accommodate the level of processing power needed at a particular instance in time. For example, the first processing instance may be expandable during peak business hours for individual POS terminals, and the second processing instance may be expandable at an end-of-day processing time during which a high number of audit data generation demands are generated.

In certain embodiments, the operations computing entity 100 is configured to calculate a sales tax amount due and to generate respective secondary transaction-specific data files for particular transactions in response to receipt of transaction data files corresponding to individual transactions with and/or embodied as calculation requests. The operations computing entity 100 stores the transactional data files in a memory upon receipt, and calculates a total sales tax amount due for each transaction data file by initiating the sales tax calculation engine indicated at Block 405 of FIG. 4.

For each given transaction data file, the sales tax calculation engine queries the tax data matrix to identify applicable tax rates for the transaction based at least in part on the location of the transaction (e.g., the location of the involved edge computing entity 110 and/or the location of a later delivery or transaction completion) and the items included in the transaction. In certain embodiments, the operations computing entity 100 (or another computing entity) may be configured to verify the transaction location (e.g., a delivery location) against an address/location validation database to ensure the transaction location is a valid, known location and to ensure that tax may be calculated for the provided location.

Tax rates may be selected in any order for a particular transaction, however, as just one example, the tax rates for a particular transaction may be identified by first identifying a location-specific tax grouping for a particular transaction, based at least in part on the location data included in the transaction data file. Using the location-specific tax grouping, tax rates for the transaction as a whole (e.g., based on a subtotal cost of the transaction), for individual items included in the transaction, for specific item combinations included in the transaction, and/or the like may be identified by locating tax rates corresponding to particular items (e.g., unique item identifiers), item categories, and/or the like represented in the transaction data.

Once the various tax rates are identified for a particular transaction, the sales tax calculation engine determines a total sales tax amount due for the transaction by applying the various tax rates according to data included in the transaction data file. For example, the sales tax calculation engine may identify a general sales tax for all items included in a transaction (e.g., applying a percentage of the subtotal of the transaction, applying a percentage of the cost of item included in the transaction, and/or the like), an item-specific sales tax based on the quantity of a particular item included in the transaction (e.g., a flat-amount due for each unit of a particular item), a transaction destination type tax (e.g., an increased tax rate for dine-in transactions), and/or the like. The sales tax calculation engine may sum the total sales tax amount due, and may generate a secondary transaction-specific data file (e.g., a tax data file) to be transmitted to the POS terminal associated with the particular transaction as indicated at Block 406. In certain embodiments, the tax data file may include at least one of the total sales tax amount due (e.g., summing all applicable individual sales tax amounts) or an itemized sales tax amount due for items included in the transaction. Moreover, the tax data file may be embodied as an updated version of the transaction data file initially transmitted from the edge computing entity 110 including, for example, additional data fields each comprising various portions of the tax calculated for the transaction. As yet another example, the tax data file may be a newly generated data file (separate from the transaction data file received from the edge computing entity 110).

In certain embodiments, the sales tax calculation engine may be configured to determine complete and/or partial sales tax exemptions for certain transactions. For example, tax exempt customers (e.g., non-profit organizations) may be entitled to certain sales tax exemptions. However, these tax exemptions are dependent on whether a particular tax law or rule permits exemptions for various organizations, and accordingly the sales tax calculation engine may be configured to determine and apply exemptions (e.g., full sales tax exemptions or partial sales tax exemptions) for various transactions based at least in part on characteristics of the transaction identified in the transaction data (e.g., a customer type, a transaction location, and/or the like) and/or exemption data stored in the tax data matrix.

The operations computing entity 100 may then transmit the tax data file to the POS terminal associated with the transaction to complete the transaction as indicated at Block 407 of FIG. 4A. The POS terminal may then update the transaction data record (e.g., of the locally stored transaction database at the POS terminal) with the tax data, and may close the transaction. The operations computing entity 100 may then clear the memory associated with the first instance of the sales tax calculation engine (as noted at Block 408), thereby erasing the transaction data file and/or the tax data file from the memory. Because the operations computing entity 100 minimizes the amount of data stored in a memory associated with the sales tax calculation engine, and because the operations computing entity 100 is configured to automatically scale the processing resources available to complete a sales tax calculation, the operations computing entity 100 is configured to calculate the sales tax due for a transaction (including receiving the transaction data file, executing the sales tax calculation engine for the transaction data file, generating the tax data file, and transmitting the tax data file to the POS terminal) quickly (e.g., in less than 0.5 seconds, in less than 0.25 seconds, or approximately 225 msec), such that the sales tax may be calculated in real-time while a transaction is being completed at the POS terminal without requiring a customer and/or sales representative to wait for a lengthy period of time while the sales tax is calculated.

In certain embodiments, the operations computing entity 100 and/or edge computing entity 110 may store metadata corresponding to each tax calculation request to enable an evaluation of the performance of the operations computing entity 100. For example, the operations computing entity 100 and/or edge computing entity 110 may store data indicative of a success/failure rate of tax calculation requests (as discussed in greater detail herein, the edge computing entities 110 may be configured to retry tax calculation requests if a particular request is deemed unsuccessful). The edge computing entities 110 may update the transaction data file to indicate the number of the request attempt (e.g., $1^{st}$ attempt, $2^{nd}$ attempt, and/or the like) to enable the operations computing entity 100 to track the number of successful and unsuccessful request attempts). Moreover, the operations computing entity 100 and/or edge computing entity 110 may store data indicative of the duration of each sales tax calculation engine initiation (e.g., between the time the request is first received to the time the tax data file is transmitted back to the edge computing entity 110). In certain embodiments, the data indicative of the success rate of each sales tax calculation request, the time for completing each sales tax calculation engine, and/or the like may be collected and stored at the edge computing entity 110, and may be periodically transmitted to the operations computing entity 100 for storage in a diagnostic database. This stored evaluation data may be utilized to diagnose potential operational problems associated with the operations computing entity 100.

The operations computing entity 100 may be further configured to self-diagnose operational errors utilizing one or more monitoring procedures. For example, the operations computing entity 100 (and/or one or more edge computing entities 110) may periodically transmit diagnostic request data files to the operations computing entity 100, or may emulate receipt of diagnostic request data files locally at the operations computing entity 100. The diagnostic request data files may be transmitted (or emulated) at known intervals (e.g., every minute) to provide a predictable stream of diagnostic request data files for the operations computing entity 100 such that, if the operations computing entity 100 is determined to not receive a diagnostic request data file, the operations computing entity 100 may generate an alert/notification/record to be sent to a relevant edge computing entity 110 (e.g., a mobile device associated with a repair personnel) to troubleshoot the detected error. In certain embodiments, 100 the operations computing entity 100 may utilize the stream of incoming tax calculation requests as the predictable stream of incoming requests for the operations computing entity 100. The operations computing entity 100 may be configured to generate an alert/notification/record upon determining that no requests are received for a predefined amount of time (e.g., no requests received within 1 minute). This assumes that the operations computing entity 100 typically receives at least one tax calculation request for each predefined amount of time, which may be an appropriate assumption for operations computing entities 100 supporting a large number of POS terminals that are geographically distributed over a large geographic area.

4. Transaction Completion

Once the sales tax calculation engine determines an applicable amount of sales tax to be collected for a particular transaction, the edge computing entity 110 (e.g., POS terminal) requesting the sales tax amount receives the tax data file, and adds the applicable amount of sales tax onto the subtotal calculated for the transaction.

Upon receipt of the tax data file from the operations computing entity 100, the edge computing entity 110 (e.g., POS terminal) stores the tax data file locally, extracts the amount of sales tax due for the transaction from the tax data file, and adds the amount of sales tax due for the transaction to the transaction subtotal. The edge computing entity 110 may display the total amount due for the transaction to the customer, and/or may generate a receipt including the subtotal and tax total for the transaction. The edge computing entity 110 may process payment information (e.g., via known credit card processing systems, by processing data indicative of a cash transaction, by processing an electronic or cryptocurrency transaction (e.g., Bitcoin), and/or the like) based on the transaction total (including the subtotal and tax total) to complete the transaction (as indicated at Block 410), and may store a completed transaction record locally at the edge computing entity 110 for each completed transaction.

The edge computing entity 110 may additionally initiate one or more backup tax calculation procedures to generate secondary transaction-specific data locally in the event the tax data file is not received from the operations computing entity 100 in response to the transmission of the transaction data file. In certain embodiments, the edge computing entity 110 may be configured to make multiple attempts to transmit the generated transaction data file to the operations computing entity 100 to request tax calculation by the sales tax calculation engine. Before transmitting each attempt, the edge computing entity 110 may increase an attempt identifier within the transaction data file to correspond to the number of attempts made to transmit the transaction data file to the operations computing entity 100. In certain embodiments, the edge computing entity 110 may be configured to continue performing additional attempts to transmit the transaction data file until a predefined maximum number of attempts is reached for a particular transaction. Upon reaching the predefined maximum number of attempts, the edge computing entity 110 may be configured to calculate sales tax for the transaction and to generate secondary transaction-specific data using locally stored tax rules, as discussed herein. In certain embodiments, the edge computing entity 110 may be configured to delete or otherwise dispose of the generated transaction data file, and the edge computing entity 110 may calculate sales tax for a transaction based on data stored in the transaction data record stored in the locally-stored transaction database.

Moreover, the edge computing entity 110 may be configured to terminate each transaction data file transmission after a predefined time period. In certain embodiments, the operations computing entity 100 may be configured to transmit data to the edge computing entity 110 indicating that the transaction data file is received at the operations computing entity 100. In certain embodiments, the edge computing entity 110 may be configured to terminate a transaction data file transmission if the receipt confirmation data is not received within a predefined time period (e.g., 3 seconds), thereby indicating that the operations computing entity 100 did not receive the transaction data file (as indicated at Block 404 of FIG. 4A). As yet another example, the operations computing entity 100 may not be configured to transmit separate receipt confirmation data to the edge computing entity 110, but instead may be configured to complete the tax calculation request and return the completed tax data file to the edge computing entity 110 within a predefined period of time. In such an event, the edge computing entity 110 may be configured to terminate a transmission request if the tax data file is not received within a predefined period of time (e.g., 3 seconds). The edge computing entity 110 may continue attempting to transmit the transaction data file until the predefined maximum number of transmission attempts is reached, or until receipt of data indicative of a successful data transmission.

Upon a determination that the operations computing entity 100 cannot be contacted to complete the sales tax calculation via the sales tax calculation engine, the edge computing entity 110 may be configured to calculate the amount of sales tax due and to generate secondary transaction-specific data for the transaction based on a locally stored tax data matrix as indicated at Block 409. The locally stored tax data matrix may be periodically updated with tax data from the operations computing entity 100 to maintain an updated backup source of tax calculation data at the edge computing entity 110. For example, upon receiving updates to the tax data matrix at the operations computing entity 100 and/or upon receiving a request for updated tax data from an edge computing entity 110, the operations computing entity 100 may transmit at least a portion of the tax data matrix update data to various edge computing entities 110 to update locally stored tax data matrices at each edge computing entity 110. The tax data matrix update data may be provided to the edge computing entities 110 periodically (e.g., daily) and/or upon receipt of tax data updates that are applicable to the edge computing entities 110.

Moreover, upon a determination that the operations computing entity 100 cannot be contacted for tax calculation services, the POS terminal may continue calculating sales tax amounts and generating secondary transaction-specific data for transactions locally for future transactions (e.g., via transaction data records stored in the locally-stored transaction database), without attempting to contact the operations computing entity 100. In certain embodiments, the POS terminal may continue periodically transmitting test data to the operations computing entity 100 to monitor whether the operations computing entity 100 becomes available later to resume transmission of transaction data files to the operations computing entity 100.

In the event that the POS terminal calculates sales tax locally, the POS terminal may be configured to execute various processes similar to those described above in reference to the sales tax calculation engine. For example, the POS terminal, using the locally stored tax data matrix, may identify relevant tax rates for the transaction based at least in part on the transaction location and/or the items included in the transaction. The POS terminal may then calculate the appropriate tax total for the transaction by summing the tax amounts due for each aspect of the transaction (e.g., each item and/or combination of items, transaction number, subtotal, and/or the like). The POS terminal may then add the tax total to the previously determined transaction subtotal as discussed above, and may process payment for the transaction. The POS terminal may then store completed transaction data locally (e.g., as a completed transaction data record), which may include an indication that the sales tax was calculated using a locally-stored tax data matrix.

Figure 4B:
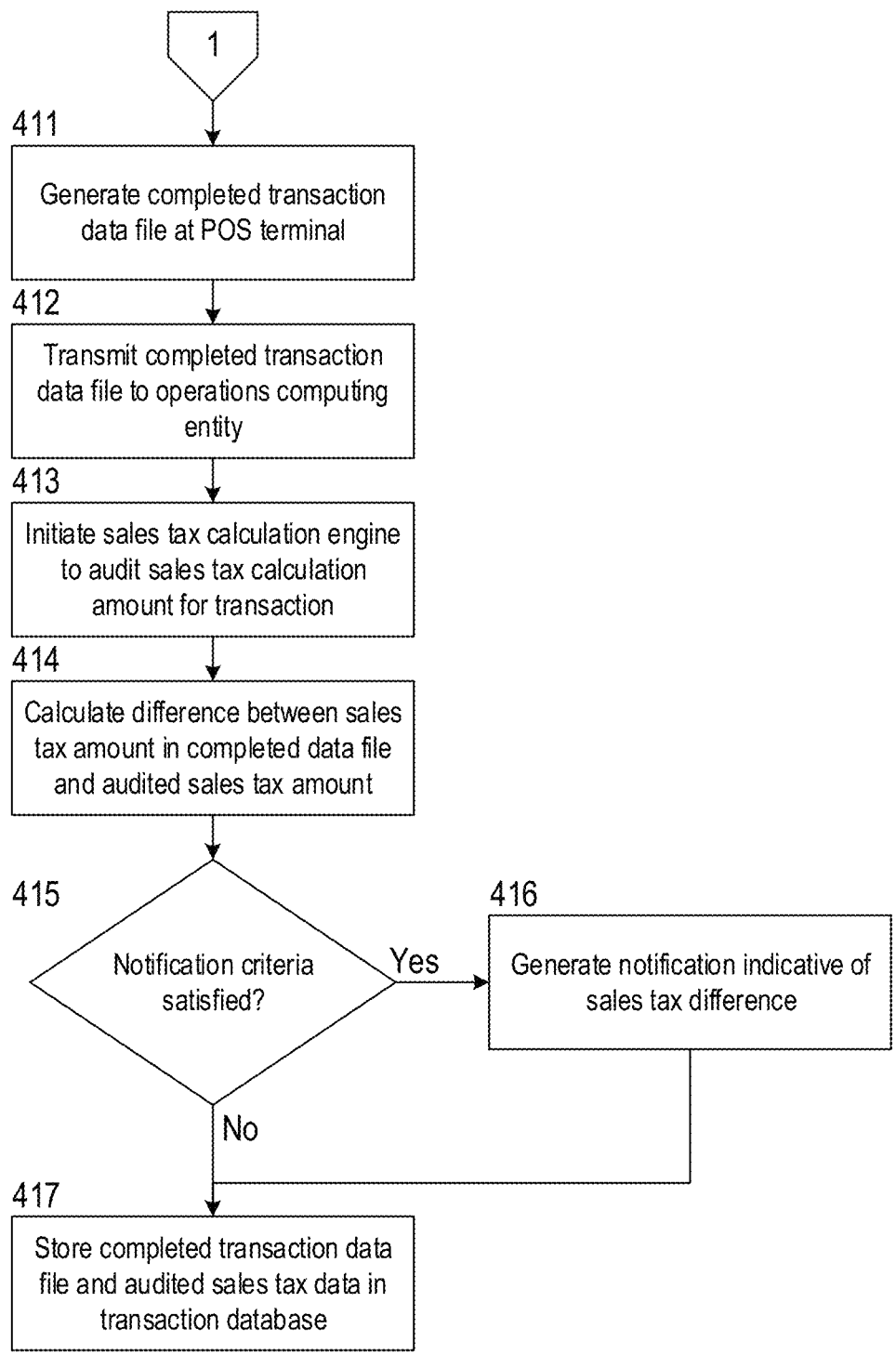

In certain embodiments, upon generating and/or storing the completed transaction data at the POS terminal as indicated at Block 411 of FIG. 4B, the POS terminal may transmit the completed transaction data to the operations computing entity 100 via a second communications channel (associated with a second URL) to complete various audit procedures as indicated at Block 412. The completed transaction data may be transmitted periodically or upon completion of the transaction. In certain embodiments, completed transaction data for each transaction may be transmitted individually, or the completed transaction data for a plurality of transactions may be transmitted in a batch format. For example, the completed transaction data may be transmitted every 5 minutes, with completed transaction data for transactions occurring in the preceding 5 minute period being included in a single transmission. As yet another example, completed transaction data for each transaction may be transmitted individually, 5 minutes after completion of the transaction.

5. Transaction Audit

After the edge computing entity 110 (e.g., POS terminal) completes the transaction, the system may complete a transaction audit procedure to ensure the appropriate amount of sales tax was collected during the transaction and to calculate the amount of sales tax to be remitted to the appropriate taxing authorities. As mentioned above, completed transaction data (including the amount of tax paid for a transaction) is transmitted from the POS terminal to the operations computing entity 100 (e.g., for a single transaction or a plurality of transactions transmitted in a batch transmission process) via a second communications channel that provides data to a second subset of processing entities associated with the operations computing entity 100, wherein the second subset does not overlap with the first subset of processing entities providing real time tax calculations for transactions. That transmitted completed transaction data may be used by the operations computing entity 100 to automatically complete an audit of one or more previously performed tax calculations, and to store the transmitted completed transaction data for each completed transaction in a transaction database for later retrieval (e.g., when remitting taxes to various governmental offices, during tax audits completed by government authorities, and/or the like). The audit process may thus identify differences in tax calculated by the tax calculation engine and the tax collected by various edge computing entities 110 that may result from, for example, incorrect tax calculations performed locally at the edge computing entities 110 (e.g., after the edge computing entity 110 is unable to contact the operations computing entity 100 during a tax calculation request), a corrupted tax data file utilized by the edge computing entity 110, an error in applying a tax data file to collect a tax amount from the customer (e.g., by the edge computing entity 110), and/or the like.

To complete the audit process for one or more transactions, the a subset of processing entities associated with a second processing instance of the operations computing entity 100 (associated with the second communications channel) queries the tax data matrix based on transaction data within a completed transaction data file as discussed above when first calculating a tax amount for the transaction. In certain embodiments, the second processing instance of the operations computing entity 100 may comprise a separate tax data matrix comprising data identical to the tax data matrix associated with the first processing instance. The operations computing entity 100 retrieves appropriate tax data for each of the completed transactions to be audited. The operations computing entity 100 thus initiates the sales tax calculation engine as indicated at Block 413 to calculate an appropriate tax amount and to generate audit data for each transaction based on the data included in the corresponding completed transaction data records. The sales tax calculation engine may generate itemized tax data broken down by taxes calculated for each item or group of items, each taxing jurisdiction/entity, and/or the like. The audit data may be stored within the completed transaction data file and stored within the transaction database (as noted at Block 417) and/or stored as a separate audit data file.

Moreover, the operations computing entity 100 compares the audit data against the tax data provided by the edge computing entity 110 in the completed transaction data file to determine a difference therebetween (which may be due to various errors, as mentioned above), as indicated at Block 414. This comparison may be completed on a transaction-by-transaction basis, or may be completed for a plurality of transactions. The comparison enables an identification of transaction-specific discrepancies between tax calculations performed via edge computing entities 110 versus tax calculations performed via the operations computing entity 100 as evidenced by differences between the secondary transaction-specific data (which may be generated by at least one of the edge computing entity 110 or the first processing instance of the operations computing entity 100). Upon determining that the difference satisfies an alert criteria as indicated at Block 415 (e.g., the single-transaction difference between the collected and audited tax amounts is greater than a threshold amount; a single POS terminal difference between the collected and audited tax amounts is greater than a threshold; a single time period (e.g., single day), difference between the collected and audited tax amounts is greater than a threshold; a single POS terminal difference during a single day between the collected and audited tax amounts is greater than a threshold; and/or the like), the operations computing entity 100 may generate and transmit an alert to various edge computing entities 110 (e.g., to edge computing entities 110 associated with maintenance personnel) as indicated at Block 416. The alerts may be made in real-time, as the audit process is completed. In certain embodiments, the audit process may be completed as completed transaction data is received at the operations computing entity 100, and accordingly the operations computing entity 100 may identify and/or remedy potential tax calculation errors shortly after those errors are made. Moreover, potential tax calculation errors may be identified automatically prior to remitting a tax amount to relevant governmental authorities, and accordingly the correct tax amount may be determined and remitted, regardless of the amount of sales tax collected from customers when completing transactions. This real-time or near real-time error detection mechanism ensures that the overall error in tax calculation is minimized, as the error may be quickly remedied in real-time or near real-time to avoid errors in future transactions after the error is detected.

V. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

Although discussed above in reference to sales taxes specifically, it should be understood that various embodiments may utilize a tax calculation engine to calculate other tax amounts in various circumstances. For example, an edge computing entity 110 may be configured to transmit use-tax data to the operations computing entity 100, which may be configured to execute a use-tax calculation engine, to identify appropriate use-tax rates, to generate a use-tax data file, and to transmit the use-tax data file to the edge computing entity 110 as needed.

That which is claimed:

1. A method for detecting transaction-specific data discrepancies among processing instances executing on geographically-distributed computing entities, the method comprising:

receiving transaction-specific data via a first network communications channel associated with a first processing instance operating on an operations computing entity, wherein the transaction-specific data is generated by an edge computing entity that is geographically-spaced from the operations computing entity;

generating, via the first processing instance of the operations computing entity executing a first instance of a sales tax calculation engine, secondary transaction-specific data for the transaction based at least in part on a tax data matrix stored in a non-transitory memory storage area;

generating, via the first processing instance, completed transaction data based at least in part on the transaction specific data and the secondary transaction specific data;

transmitting, via the first processing instance, at least a portion of the completed transaction data for delivery to the edge computing entity;

receiving at least a portion of the completed transaction data from the edge computing entity at a second processing instance operating on the operations computing entity via a second network communications channel, wherein the second network communications channel is distinct from the first network communications channel and the second processing instance is distinct from the first processing instance operating on the operations computing entity;

generating, via the second processing instance of the operations computing entity executing a second instance of the sales tax calculation engine, audit data for the transaction;

identifying, via the second processing instance of the operations computing entity, one or more discrepancies between the secondary transaction-specific data and the audit data; and generating, via the second processing instance of the operations computing entity, a record upon the detection of a discrepancy between the secondary transaction-specific data and the audit data.

2. The method for detecting transaction-specific data discrepancies of claim 1, wherein:

generating the secondary transaction-specific data for the transaction via the first processing instance of the operations computing entity comprises executing a first copy of programming instructions; and generating the audit data for the transaction via the second processing instance of the operations computing entity comprises executing a second copy of programming instructions, wherein the first copy and the second copy include identical programming instruction portions.

3. The method for detecting transaction-specific data discrepancies of claim 1, wherein:

receiving transaction-specific data comprises receiving transaction-specific data generated during initiation of a transaction via the edge computing entity; and generating the secondary transaction-specific data and generating the audit data each comprise generating tax data identifying tax amounts due for corresponding sales transactions.

4. The method for detecting transaction-specific data discrepancies of claim 1, wherein:

receiving transaction-specific data comprises receiving a transaction data file corresponding to a transaction, wherein the transaction data file is generated at the edge computing entity;

and generating secondary transaction-specific data for the transaction comprises:

detecting the occurrence of a trigger event; and generating the secondary transaction-specific data for the transaction.

5. The method for detecting transaction-specific data discrepancies of claim 4, wherein the trigger event is an elapsed period of time.

6. The method for detecting transaction-specific data discrepancies of claim 1, wherein:

receiving the transaction-specific data at a first processing instance comprises receiving the transaction-specific data transmitted to a first Uniform Resource Locator (URL); and receiving at least a portion of the completed transaction data at a second processing instance comprises receiving the at least a portion of the completed transaction data transmitted to a second URL.

* * * * *